United States Patent
Sakai et al.

(10) Patent No.: US 6,504,146 B1
(45) Date of Patent: Jan. 7, 2003

(54) DISK-MOUNTING STRUCTURE FOR OPTICAL ENCODER

(75) Inventors: Yoshihiro Sakai, Kitakyushu (JP); Kazuo Tashiro, Kitaskyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/743,453

(22) PCT Filed: Jul. 8, 1999

(86) PCT No.: PCT/JP99/03698

§ 371 (c)(1),
(2), (4) Date: Jan. 10, 2001

(87) PCT Pub. No.: WO00/03203

PCT Pub. Date: Jan. 20, 2000

(30) Foreign Application Priority Data

Jul. 10, 1998 (JP) .......................................... 10-195533

(51) Int. Cl.[7] ................................................ G01D 5/34
(52) U.S. Cl. .................................... 250/231.13; 341/13
(58) Field of Search ............................ 250/231.13–14, 250/231.16–18; 359/234–235; 356/614, 616, 617; 341/11, 13, 31

(56) References Cited

U.S. PATENT DOCUMENTS

| | | | | |
|---|---|---|---|---|
| 4,740,691 A | * | 4/1988 | Ushiyama | 250/231.13 |
| 5,126,560 A | * | 6/1992 | Kraus | 250/231.13 |
| 5,176,085 A | * | 1/1993 | Hara et al. | 112/275 |
| 5,786,646 A | * | 7/1998 | Newberg et al. | 310/68 B |
| 5,923,032 A | * | 7/1999 | Carlson et al. | 250/231.13 |

FOREIGN PATENT DOCUMENTS

| | | |
|---|---|---|
| JP | U-H5-59237 | 8/1993 |
| JP | U-H7-38918 | 7/1995 |
| JP | A-H8-159807 | 6/1996 |

* cited by examiner

*Primary Examiner*—Kevin Pyo
*Assistant Examiner*—Seung C. Sohn
(74) *Attorney, Agent, or Firm*—Armstrong, Westerman & Hattori, LLP

(57) ABSTRACT

An optical encoder is provided in which a disk is prevented from eccentric rotation. An optical encoder comprises a shaft (2) supported on a bearing (3) in a housing (1), a rotating disk (4) having a code pattern and fixed to the shaft (2), a photodetector element (12) which receives light passing through the rotating disk (4) from a light-emitting element (10) and converts it into an electric signal, and a substrate (13) on which is mounted a circuit for detecting a signal in the electric signal. The shaft (2) is inserted in a hole (4a) opened in the center of the rotating disk (4), the backside of which is seated on a step (2a) of the shaft (2). The optical encoder further comprises a spacer (5) fitted loosely over the shaft (2) and placed on an adhesive (6) spread on the rotating disk (4), a ring (7) for fixing the spacer (5) and the disk (4) tentatively to the shaft (2), and adhesive (8) spread on the spacer (5), the ring (7) and the shaft (2). This structure prevents the adhesive (8) from entering between the thinner part (2b) of the shaft (2) and the hole (4a) of the disk (4) and between the backside of the disk (4) and the step (2a).

1 Claim, 2 Drawing Sheets

DISK-MOUNTING STRUCTURE FOR OPTICAL ENCODER

BACKGROUND OF THE INVENTION

1. Field of the Invention

The present invention relates to a disk-mounting structure for an optical encoder.

2. Description of the Related Art

A prior-art disk-mounting structure for an optical encoder is constructed as shown in FIG. 2 and FIG. 3.

In the drawings, 20 denotes a housing which is attached to a bracket of a motor (not illustrated). 21 denotes a shaft which is supported on the housing 20 via a bearing 22, a thinner part 21b is provided on the upper portion of said shaft 21, and a thicker part 21c is provided on the lower part of the same. Also, a step 21a is provided between the thinner part 21b and the thicker part 21c. 23 denotes a rotating disk made of a transparent member such as glass and a pattern (not illustrated) of a obstructing part or a light-transmitting part is provided on the plate surface thereof. A hole 23a of the rotating disk 23 is put on the thinner part 21b of the shaft 21, the bottom surface of the rotating disk 23 is seated on the step 21a, and an annular ring 24 is attached on the top surface of the rotating disk 23. 25 denotes an adhesive applied between the ring 24 and the shaft. 26 denotes a holder of a light-emitting element and the light-emitting element 27 is attached to the holder. 28 denotes a subboard attached to the housing 20 and a photodetector element 29 is attached on the plate surface of the subboard 28. 30 denotes a main board attached to the housing 20 via a supporter (not illustrated), said main board 30 and the subboard 28 are connected by means of a connection wire (not illustrated), and electronic components composing a circuit to detect the amount of rotation are mounted on the plate surface of the main board 30.

Now, the assembly work for an optical encoder will be explained.

The hole 23a of the rotating disk 23 is put on the thinner part 21b of the shaft 21 and the bottom surface of the rotating disk 23 is seated on the step 21a of the shaft 21. The ring 24 is fitted in the thinner part 21b of the shaft 21, a projecting piece of the ring 24 is bent, and the rotating disk 23 is tentatively fixed by means of the ring 24 and the step 21a of the shaft 21. In this condition, while the rotating disk 23 is rotated, the rotating disk 23 is centered. The adhesive is applied through the clearance of the projecting piece of the ring 24, the ring 24 is buried under the adhesive, and the rotating disk 23 is fixed on the shaft 21.

The rotating disk 23 is thus fixed on the shaft 21 and then, the light-emitting element 27, the photodetector 29, and the subboard 28 are attached thereto.

However, in the prior-art optical encoder, the ring 24 is buried under the adhesive so that fixation strength is provided for the rotating disk, and therefore, the adhesive enters between the hole 23a of the rotating disk 23 and the shaft 21 and between the rotating disk 23 and the step 21a of the shaft 21, this adhesive shrinks due to changes in temperature, and displacement, eccentricity, and surface oscillation of the rotating disk are caused, whereby detection accuracy is lowered.

SUMMARY OF THE INVENTION

Therefore, the present invention aims to provide a disk-mounting structure for an optical encoder which has a high detection accuracy without producing displacement, eccentricity, or surface oscillation of the rotating disk.

In order to solve the above described problem, according to the present invention, a disk-mounting structure for an optical encoder comprising a housing, a bearing attached to the housing, a shaft supported on the bearing, a rotating disk which is fixed to the shaft and has a code pattern comprising a light-transmitting part or a light-obstructing part, a photodetector which directly or indirectly receives light, from a light-emitting element, which has passed through the light-transmitting part of the rotating disk and changes the light to an electric signal, and a board mounted with a circuit for detecting the amount of rotation or rotational position of the shaft from the electric signal further comprises a rotating disk in which a hole through which the shaft penetrates is opened at the center thereof and the rear surface thereof is seated on a step of the shaft, a spacer which is loosely fitted over the shaft and placed on an adhesive surface applied on the top surface of the rotating disk, a ring which is thrust onto the shaft for fixing the spacer and the rotating disk tentatively to the shaft, and adhesive applied on the spacer, the ring, and the shaft.

As mentioned above, according to the present invention, since the adhesive for fixing the rotating disk is prevented from entering between the outer circumference of the shaft and the inner circumference of the hole of the rotating disk or between the step and the rotating disk, the displacement, eccentricity, or surface oscillation of the rotating disk does not occur, whereby an optical encoder having a high detection accuracy of the amount of rotation and rotational position can be provided.

DETAILED DESCRIPTION OF THE PREFERRED EMBODIMENTS

Hereinafter, an embodiment of the present invention will be described in detail with reference to the drawings.

Figure 1:
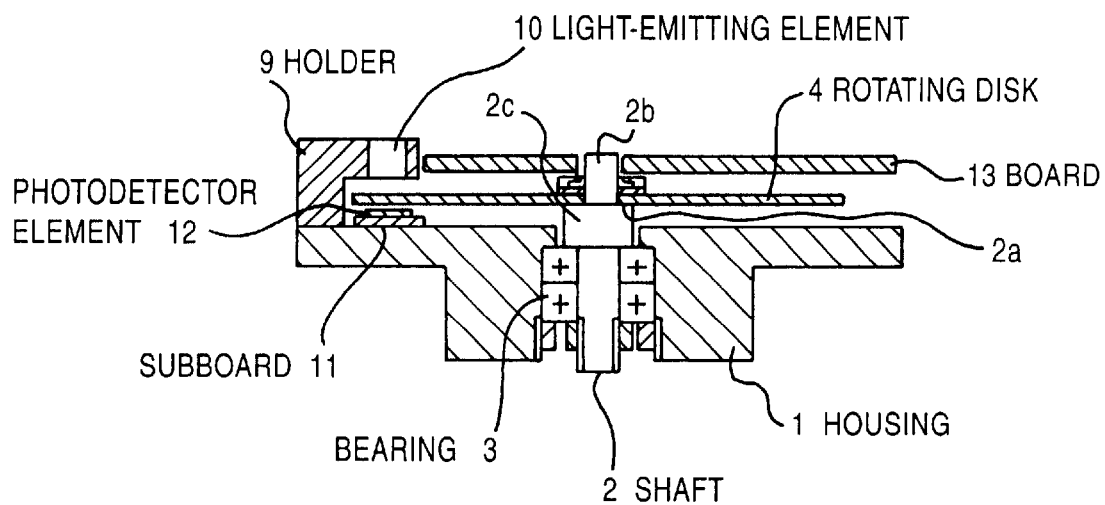
FIG. 1 shows an embodiment of the present invention, wherein (a) is a side section of the optical encoder and (b) is an enlarged view of the main part.
Figure 1:
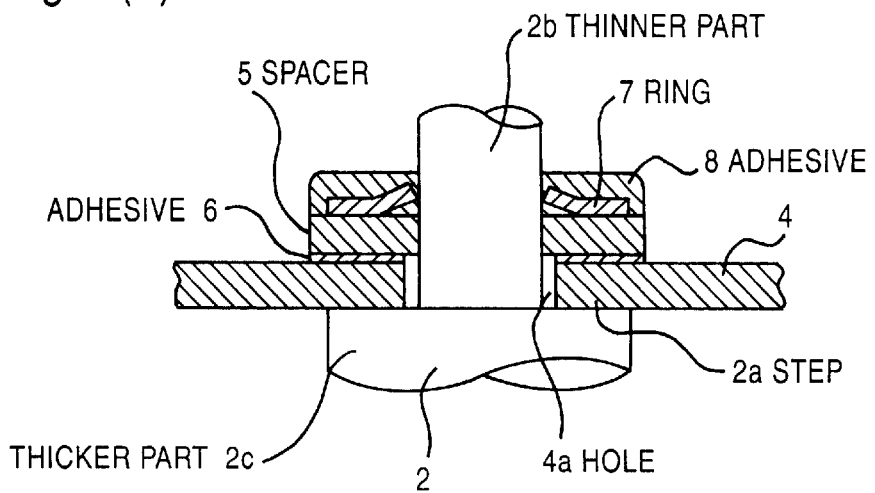
Figure 2:
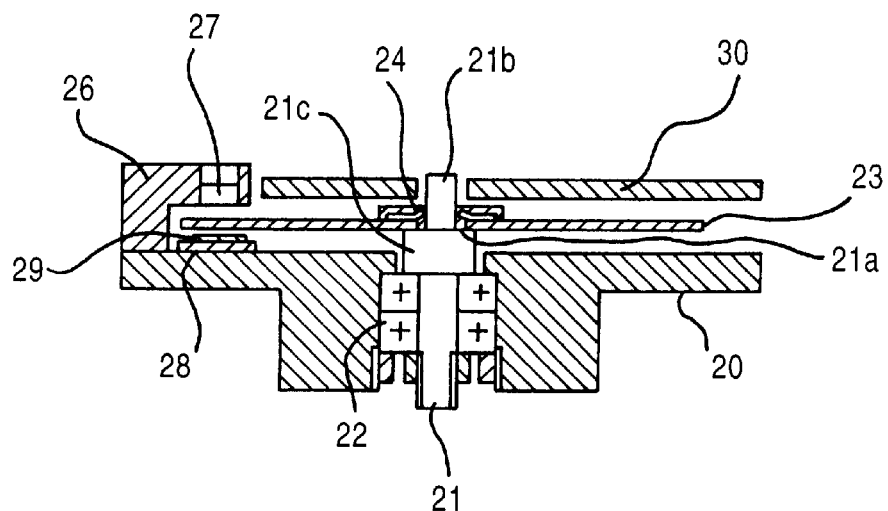
FIG. 2 is a side section of the prior-art optical encoder.
Figure 3:
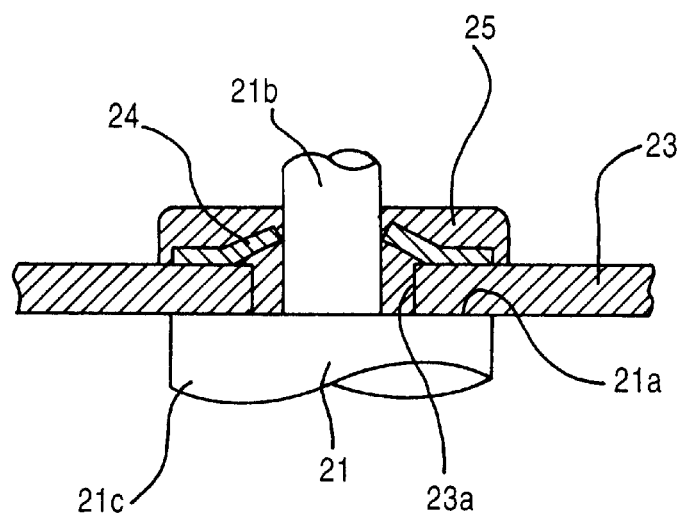
FIG. 3 is an enlarged view of the main part of the prior-art optical encoder.

FIG. 1 shows a preferred embodiment of the present invention, wherein (a) is a side section of the optical encoder and (b) is an enlarged view of the main part.

In the drawings, 1 denotes housing. 2 denotes a shaft which is supported on the housing 1 via a bearing 3. A step 2a is provided between a thinner part 2b provided on the upper portion of said shaft 2 and a thicker part 2c on the lower portion of the same. 4 denotes a rotating disk which is made of a transparent member such as glass and is provided with a pattern (not illustrated) of a light-obstructing part or a light-transmitting part, and a spacer 5 which is loosely fitted over the shaft 2 is provided on the top surface of the rotating disk 4. 4a denotes a hole in the rotating disk 4. 6 denotes an adhesive applied between the rotating disk 4 and said spacer 5. 7 denotes an annular ring placed on the top surface of the spacer 5. 8 denotes an adhesive filled between the top surface of the ring and the rotating shaft 2, and 9 denotes a holder of an light-emitting element 10 and which is fixed on the housing 1 with the light-emitting element 10 attached to the holder 9. 11 denotes a subboard attached to the housing 1 and a photodetector element 12 is attached on the plate surface of the subboard. 13 denotes a board which is attached to the housing 1 via a supporter (not illustrated), said board 13 and the subboard 11 are connected by means of a connection wire (not illustrated), and electronic components (not illustrated) composing a circuit to calculate the amount of rotation are mounted on the plate surface of the board 13.

Now, the assembly work for an optical encoder will be explained.

The hole 4a of the rotating disk 4 is fitted onto the thinner part 2b of the shaft 2 and the plate surface of the rotating disk 4 is seated on the step 2a of the shaft 2. The spacer 5 is loosely fitted over the shaft 2 and is fitted onto the rotating shaft 2. The adhesive 6 is applied on the bottom surface the spacer 5, which is then placed on the top surface of the rotating disk 4, whereby the spacer is loosely fitted and attached to the rotating shaft 2. After the attachment of this spacer 5 to the shaft 2, the ring 7 is attached to the shaft 2 and by thrusting a projecting piece of the ring 7 by means of a jig, the projecting piece of the ring 7 is bent, whereby the rotating disk 4 is tentatively fixed by the ring 7 onto the step 2a. Before the adhesive applied between the rotating disk 4 and the spacer 5 hardens, by means of a microscope (not illustrated), the rotating disk 4 is centered while the rotating disk 4 is rated, and the adhesive 8 is then applied on the ring 7, the spacer 5, and the shaft 2, the ring 7 is buried under the adhesive 8, and the rotating disk 4 is fixed. Consequently, because the spacer 5 is loosely fitted over the shaft 2, the adhesive 8 is prevented from entering between the outer circumference of the thinner part 2b of the shaft 2 and the inner circumference of the hole 4a of the rotating disk 4 and between the bottom surface of the rotating disk 4 and the stop 2a.

The present invention can be applied to optical encoders and whereby it can be utilized in a field to provide a disk-mounting structure for an optical encoder which has high detection accuracy without producing displacement, eccentricity, or surface oscillation of the rotating disk.

What is claimed is:

1. A disk-mounting structure for an optical encoder, comprising:

a housing;

a bearing attached to the housing;

a shaft supported on the bearing;

a rotating disk which is fixed to the shaft and has a code pattern comprising a light-obstructing part or a light-transmitting part, said rotating disk having a hole in its center through which the shaft penetrates and a rear surface thereof is seated on a step of said shaft;

a photodetector which directly or indirectly receives light, from a light-emitting element, which has passed through the light-transmitting part of the rotating disk and changes the light to an electric signal;

a board mounted with a circuit for detecting the amount of rotation or rotational position of the shaft from the electric signal;

a spacer which is loosely fitted over the shaft and placed on an adhesive surface applied on the top surface of the rotating disk;

a ring which is thrust onto the shaft for fixing the spacer and the rotating disk to the shaft; and adhesive applied on the spacer, the ring, and the shaft.

* * * * *